United States Patent [19]

Sumii et al.

[11] Patent Number: 4,830,900

[45] Date of Patent: May 16, 1989

[54] INTERIOR MATERIAL FOR CARS

[75] Inventors: Yoshiyuki Sumii; Sumio Toda, both of Moriyama, Japan

[73] Assignee: Japan Vilene Company, Ltd., Tokyo, Japan

[21] Appl. No.: 20,981

[22] Filed: Mar. 2, 1987

[30] Foreign Application Priority Data

Mar. 3, 1986 [JP] Japan ................................. 61-47121

[51] Int. Cl.$^4$ ............................................ B32B 27/12
[52] U.S. Cl. .................................... 428/195; 428/182; 428/285; 428/286; 428/317.1; 428/920; 428/34.5; 428/35.6; 428/36.1
[58] Field of Search ........................ 428/195, 285, 286

[56] References Cited

FOREIGN PATENT DOCUMENTS 56-16585  2/1981  Japan .
58-25718  2/1983  Japan .
60-255874 12/1985  Japan .
61-29532  2/1986  Japan .

*Primary Examiner*—James C. Cannon
*Attorney, Agent, or Firm*—Armstrong, Nikaido Marmelstein Kubovcik & Murray

[57] ABSTRACT

An interior material for cars comprising a web in which at least 3% by weight of a rayon fiber is contained, of which one side surface is impregnated with a binder and which has a 20% modulus of 1 to 15 kg/5 cm. width in both longitudinal direction and transverse direction, a base material laminated on the binder-impregnated surface of the web and a resin print laminated on the other side surface of the web. The interior material can be easily subjected to molding such as deep drawing since no space is generated between a base sheet and a nonwoven fabric. Further, since the interior material has an excellent flame resistance, it can be suitably used as an interior material such as a ceiling material, a door trim board or a pillar garnish material.

3 Claims, No Drawings

INTERIOR MATERIAL FOR CARS

BACKGROUND OF THE INVENTION

The present invention relates to an interior material for cars, and more particularly to an interior material for cars which can be suitably used as an interior material of which moldability is required such as a ceiling material of a car.

Conventional interior materials made by laminating a needle punched non-woven fabric of which one side surface is impregnated with a binder and a base sheet, for example, a resin felt, a sheet of foamed polystyrene, a corrugated boad or the like through the aid of a hot-melt adhesive agent have the defects that the needle punched non-woven fabric does not follow a mold and spaces are generated between the needle punched non-woven fabric and the base material due to the adhesive failure of the hot-melt adhesive agent, that is, the non-woven fabric is separated from the base material and spaces are generated when the interior materials are subjected to deep drawing.

Accordingly, in order to solve the above-mentioned defects, (A) A process for giving followability to the non-woven fabric by reducing the amount of the binder which is used in backing or (B) A process for applying previously an adhesive agent to the point of the non-woven fabric which is separated from the base sheet with the exception of a process for applying a hot-melt adhesive agent, a film such as a thermoplastic resin film, a web or the like between the non-woven fabric and the base sheet is applied.

However, in case the above-mentioned process (A) is applied, there is a problem that an obtained interior material does not have sufficient durability as an interior material for cars since the abrasion resistance, strength and the like of the non-woven fabric are lowered, and further, for instance, when a flame retardant is added in the binder to give flame resistance to the non-woven fabric, the used amount of the flame retardant is substantially lowered since the amount of the flame retardant in the binder has a limitation and therefore, the flame resistance of the non-woven fabric is inevitably lowered.

In case the above-mentioned process (B) is applied, there is a problem that the productivity of an interior material is extremely wrong since it is very difficult to determine the range of the non-woven fabric to be applied the adhesive agent and it takes a long time to apply the adhesive agent.

As the results of the inventors' researches to give an interior material for cars to be removed the above-mentioned disadvantages, they have eventually found an interior material having satisfiable durabilities and flame resistance as well as an excellent moldability, and they have accomplished the present invention.

These and other objects of the present invention will become apparent from the description hereinafter.

SUMMARY OF THE INVENTION

In accordance with the present invention, there is provided an interior material for cars comprising a web in which at least 3% by weight of a rayon fiber is contained, of which one side surface is impregnated with a binder and which has a 20% modulus of 1 to 15 kg/5 cm. width in both longitudinal direction and transverse direction, a base sheet laminated on the binder-impregnated surface of the web and a resin printed on the other side surface of the web.

DETAILED DESCRIPTION

The term "20% modulus" in the specification means a stress when the elongation percentage of a base fabric is 20%.

In the present invention, since a non-woven fabric having a 20% modulus of 1 to 15 kg/5 cm.width in both longitudinal direction and transverse direction is employed, an obtained interior material is excellent in followability to a molding and spaces are not generated between a base sheet and the non-woven fabric when the obtained interior material is subjected to molding such as deep drawing. Further, since at least 3% by weight of a rayon fiber is contained in the web, durabilities such as abrasion resistance on the surface of the obtained interior material and flame resistance are improved.

Examples of a fiber used in the web in the present invention are, for instance, a synthetic fiber such as a polyester fiber, a nylon fiber, a polyvinyl chloride fiber, an acrylic fiber, a polypropylene fiber or a polyethylene fiber. These fibers may be employed alone or in admixture thereof. Among them, the polyester fiber is suitably used since few heat deterioration or colour fade-out of the polyester fiber is generated when it is at a high temperature and the polyester fiber is excellent in heat resistance, weatherability and antifouling property. It is preferable that at least 3% by weight of a rayon fiber is contained in the web in order to maintain the excellent flame resistance of an obtained interior material. Though the rayon fiber is burned per se, since the rayon fiber forms a carbonized structure and the carbonized structure maintains the form of a sheet and the burning rate of the whole sheet is delayed when the rayon fiber is burned, the obtained interior material shows flame resistance which satisfies, e.g., Federal Motor Vehicle Safety Standard No. 302 (FMVSS 302). When the amount of the rayon fiber contained in the web is less than 3% by weight of the web, it is not preferable since it is difficult to be dispersed the rayon fiber uniformly in the web and an interior material having flame resistance which satisfies enoughly for practical use cannot be obtained. Hence, when the amount of the rayon fiber contained in the web is so much, the flame resistance is not improved enoughly in case the obtained interior material is used as an interior material for cars and further, various properties required in an interior material such as weatherability and abrasion resistance are lowered. Therefore, it is preferable that the amount of the rayon fiber contained in the web is at most 10% by weight of the web. Further, it is particularly preferable that a web comprising two layers, one of which is a fiber layer containing a rayon fiber and the other of which is a fiber layer not containing a rayon fiber is employed and that the fiber layer containing the rayon fiber is laid on a base sheet so that the fiber layer not containing a rayon fiber is used as a surface layer of an interior material since the flame resistance is improved without being lowered the durabilities required in an interior material.

A non-woven fabric used in the present invention is produced by needling the web and impregnating the web with a binder.

The needling is usually carried out in the condition that the needle density is 250 to 300 strokes/cm². However, in order to produce a non-woven fabric having a 20 modulus of 1 to 15 kg/5 cm.width, the needle density is prepared to be 100 to 250 strokes/cm², preferably 100 to 200 strokes/cm². When the needle density is less than 100 strokes/cm², the abrasion resistance of an obtained interior material is lowered or the interior material is lack in mechanical strength. Therefore, it is preferable that the needle density is usually at least 100 strokes/cm² and further, only the one side surface of the web is subjected to needling so that the obtained non-woven fabric has a napped surface and an excellent feeling or external appearance, and an excellent abrasion resistance. For instance, when the above-mentioned web having two fiber layers, one of which contains a rayon fiber and the other of which does not contain a rayon fiber is employed, it is preferable that the surface of the fiber layer containing the rayon fiber which is to be a surface of an obtained interior material is subjected to needling.

It is preferable that the ratio of the weight of fibers composing a non-woven fabric to the weight of a binder is larger than the range of 75/25 to 85/15 which is a conventional range, in order to give a non-woven fabric having a 20% modulus of 1 to 15 kg/5 cm.width in both longitudinal direction and transverse direction. Therefore, it is preferable that the ratio is not less than 85/15 in order to regulate the 20% modulus within the above-mentioned desired range. Further, with due regard to the durabilities such as abrasion resistance of the obtained non-woven fabric, it is preferable that the ratio is not more than 95/5.

The binder may be impregnated into both surfaces of the non-woven fabric. However, in order to maintain the feeling of the non-woven fabric, it is preferable that the binder is impregnated into only one side surface of the non-woven fabric. Further, it is preferable that the ratio of the thickness of the impregnated layer with a binder of the non-woven fabric to the thickness of the web is $\frac{1}{3}$ to $\frac{2}{3}$. Examples of a resin used in the binder are, for instance, ethylenevinyl chloride resins, ethylene-vinyl acetate resins, ethylene-vinyl acetate-vinyl chloride resins, vinylidene chloride resins, vinyl chloride resins, polyesters, acrylic ester resins, and these resins are usually employed in the condition of emulsion. Further, as occasion demands, a flame retardant such as a phosphorus-containing flame retardant, a halogen atom-containing flame retardant, an antimony-containing flame retardant, a hydroxide-containing flame retardant or an organic phosphorus-halogen atom-containing flame retardant; a thickener such as a cellulose-containing thickener, a sodium alginate-containing thickner or a polyacrylate-containing thickner; a filler such as kaoline, talc or titanium oxide; surfactants; thermoplastic resin powder, and the like may be added in the binder In particular, when the flame retardant is employed, the amount of the flame retardant is prepared within the range of 5 to 30% by weight of the solid content of the binder.

Examples of a process for impregnating the above-mentioned binder into a non-woven fabric are, for instance, a process for impregnating a foamy binder, a process for spraying, a process for coating, and the like. However, in the present invention, the process is not limited to the exemplified ones and other processes may be employed.

Further, in the present invention, a resin is printed on the surface which is not impregnated with a binder of the non-woven fabric in order to improve the abrasion resistance of the non-woven fabric and the design of the surface. Examples of the resin are, for instance, acrylic resins, polyester resins, ethylene-vinyl acetate resins, polyethylene resins, urethane resins, and the like. Among them, acryl-ester resins and polyester resins are particularly preferably used since they are excellent in antifouling property. The applied amount of the resin printed on the non-woven fabric is prepared to be 5 to 15 g/m². When the applied amount is less than 5 g/m², the non-woven fabric does not have enough abrasion resistance, and when the applied amount is more than 15 g/m², the non-woven fabric is not suitable for deep drawing since the modulus of the non-woven fabric is heightened as well as the feeling of the surface of the non-woven fabric is lowered.

The non-woven fabric used in an interior material for cars of the present invention is excellent in moldability and processability and further, it has several properties needed for an interial material for cars since the non-woven fabric is prepared to have a 20 modulus of 1 to 15 kg/5 cm.width in both longitudinal direction and transverse direction by selecting properly the elements of the fiber, the condition of needling, the used amount of the binder, the amount of the resin used for printing, and the like based on the above-mentioned scopes.

The surface impregnated with a binder of the non-woven fabric is united with a base sheet through the aid of an adhesive agent. As a base sheet, any conventional sheet may be employed in the present invention. Examples of the base sheet are, for instance, a resin felt, a glass fiber felt, a sheet of foamed polystyrene, a corrugated board, a thermoplastic resin sheet, and the like. In the present invention, the base sheet is not limited to the exemplified ones and other base sheets may be employed.

The above-mentioned non-woven fabric is united with the base sheet through the aid of a film of thermoplastic resin such as a film of polyamide, polyolefin, polyester or ethylene-vinyl acetate; thermoplastic resin powder; a web-like adhesive agent sheet, or the like at the same time they are molded by the heat of molding.

The interior material for cars of the present invention can be easily followed a mold although the interior material is subjected to, e.g., deep drawing. Therefore, there is no generation of spaces between the base sheet and the non-woven fabric. Further, the interior material satisfies the standard that the flame resistance is less than 10 cm/minute which is restricted in FMVSS No. 302. Therefore, the interior material can be suitably used as a ceiling material, a door trim, a pillar garnish material for cars, or the like.

The present invention is more specifically described and explained by means of the following Examples. It is to be understood that the present invention is not limited to Examples, and various changes and modifications may be made in the invention without departing from the spirit and scope thereof.

EXAMPLE 1

A web (area weight: 200 g/m²) comprising 95% by weight of a polyester fiber (fineness: 3 deniers, fiber length: 64 mm) and 5% by weight of a rayon fiber (fineness: 3 deniers) was needled (needle density: about 180 strokes/cm ², needle depth 10 mm), and then the needled surface of the web was impregnated with an ethylene-vinyl chloride resin-containing emulsion having a solid content of 20% by weight of an ester phosphate-containing flame retardant and was dried. In this case, the weight ratio of the fiber to the binder was 95/5.

Subsequently, a non-woven fabric having area weight of 220 g/m² was formed by printing a polyester resin to have area weight of 10 g/m² on the surface which was not impregnated with a binder of the web.

The 20% modulus and abrasion resistance were measured in accordance with the following methods.

The results ae shown in Table 2.

(20% modulus)

The non-woven fabric was cut to give five test pieces having a size of 5 cm×20 cm.

The stress (kg) of the test piece was measured when the elongation percentage was 20% and the average value of the stress was calculated. The stress was measured in accordance with JIS L 1068 and the speed of tensioning was 20 cm/min.

(Abrasion resistance)

An abrasion wheel (CS-10) on which the weight of 250 g was added was contacted with a test piece and the abrasion wheel was rotated 500 times at 60 rpm. Then the abrased surface was observed and judged.

The criterion for judgement was shown in Table 1.

TABLE 1

| Grades | Criterion for judgement |
| --- | --- |
| 5 | There is no change. |
| 4 | There are a few changes. |
| 3 | Obvious changes can be seen. |
| 2 | Changes are a little remarkable. |
| 1 | Changes are remarkable. |

Then the obtained non-woven fabric was laminated with a resin felt through the aid of a polyamide film and they were united together by heating in a metalic mold to give an interior material. The moldability and flame resistance of the interior material were measured in accordance with the following methods. The results are shown in Table 3.

(Moldability)

The interior material was observed whether there was a space between the base sheet and the non-woven fabric or not. When there was no space, the judgment was "excellent" and when there was a space, the judgment was "wrong".

(Flame resistance)

The flame resistance was evaluated in accordance with Federal Motor Vehicle Safety Standard of USA (hereinafter referred to as "FMVSS No. 302).

The flame resistance was judged by measuring the burned distance of the interior material per minute. When the burned distance was more than 10 cm/min, it was judged that the interior material was unsuitable as an interior material for cars.

The non-woven fabric was extremely excellent in followability to a metalic mold and there was no space between the resin felt and the non-woven fabric at any portion such as a portion which was subjected to deep drawing. Further, the flame resistance of the interior material was suited with the standard of an interior material for cars.

COMPARATIVE EXAMPLE 1

A web (area. weight: 200 g/m²) comprising 100% by weight of a polyester fiber (fineness: 3 deniers, fiber length: 64 mm) was needled (needle density: about 260 strokes/cm², needle depth: 10 mm), and then the needled surface of the web was impregnated with an ethylene-vinyl chloride resin-containing emulsion having a solid content of 20% by weight of an ester phosphate-containing flame retardant and was dried. In this case, the weight ratio of the fiber to the binder was 95/5.

Subsequently, a non-woven fabric having an area weight of 220 g/m² was formed by printing a polyester resin to have area weight of 10 g/m² on the surface which was not impregnated with a binder.

The 20% modulus and abrasion resistance were measured in the same manner as in Example 1. The results are shown in Table 2.

The obtained non-woven fabric was laminated with a resin felt through the aid of a polyamide film and they were united together by heating to give an interior material. The moldability and flame resistance of the interior material were measured in the same manner as in Example 1. The results are shown in Table 3. There was generated adhesive failure at the portion which was subjected to deep drawing and further a few spaces were generated between the resin felt and the non-woven fabric. And moreover, the flame resistance was very wrong.

COMPARATIVE EXMAPLE 2

A web (area weight: 168 g/m²) comprising 100% by weight of a polyester fiber was needled (needle density: about 260 strokes/cm², needle depth: 10 mm), and the needled surface of the web was impregnated with ethylene-vinyl chloride resin-containing emulsion having a solid content of 20% by weight of an ester phosphate-containing retardant and was dried. In this case, the weight ratio of the fiber to the binder was 80/20.

Subsequently, a non-woven fabric having area weight of 220 g/m² was formed by printing a polyester resin having area weight of 10 g/m² on the surface which was not impregnated with a binder.

The 20% modulus and abrasion resistance were measured in the same manner as in Example 1. The results are shown in Table 2.

The obtained non-woven fabric was laminated with a resin felt through the aid of a polyamide film and they were united together by heating to give an interior material. The moldability and flame resistance of the interior material were measured in the same manner as in Example 1. The results are shown in Table 3.

The feeling of the obtained interior material was hard and also, the moldability was extremely wrong. Further, the interior material did not have enough flame resistance although a large amount of a fire retardant was added in the binder.

TABLE 2

| | 20% Modulus (kg/5 cm · width) | | Abrasion resistance (grade) |
| --- | --- | --- | --- |
| | longitudinal direction | transverse direction | |
| Ex. No. 1 | 10.7 | 2.9 | 4 |
| Com. Ex. 1 | 15.6 | 6.9 | 4 |
| Com. Ex. 2 | 31.0 | 5.2 | 4 |

TABLE 3

|  | Moldability | Flame resistance (cm/min) |
|---|---|---|
| Ex. No. 1 | Excellent | 6.2 |
| Com. Ex. 1 | wrong | 16.8 |
| Com. Ex. 2 | wrong | 14.1 |

In addition to the ingredients used in the Examples, other ingredients can be used in the Examples as set forth in the specification to obtain substantially the same results.

What is claimed is:

1. A moldable interior material for cars comprising:
   a needled, non-woven web containing therein at least 3% by weight of a rayon fiber and with one surface thereof impregnated with a binder, said web having a 20% modulus of 1 to 15 kg/5 cm. width in both longitudinal and transverse directions;
   a base sheet laminated to the binder-impregnated surface of the web by a thermoplastic material; and
   a resin printed on the surface of the web not laminated to the base sheet.

2. An interior material for cars according to claim 1, wherein the ratio of the weight of the web to the weight of the binder is not less than 85/15.

3. An interior material for cars according to claim 2, wherein the said ratio is 85/15 to 95/5.

* * * * *